J. L. FITTS.
THERMOSTATICALLY CONTROLLED VALVE.
APPLICATION FILED JAN. 17, 1921.

1,425,189.

Patented Aug. 8, 1922.
3 SHEETS—SHEET 1.

Witness:
Walter Chiam.

Inventor:
James Logan Fitts
by
Murray O. Boyer
Attorney.

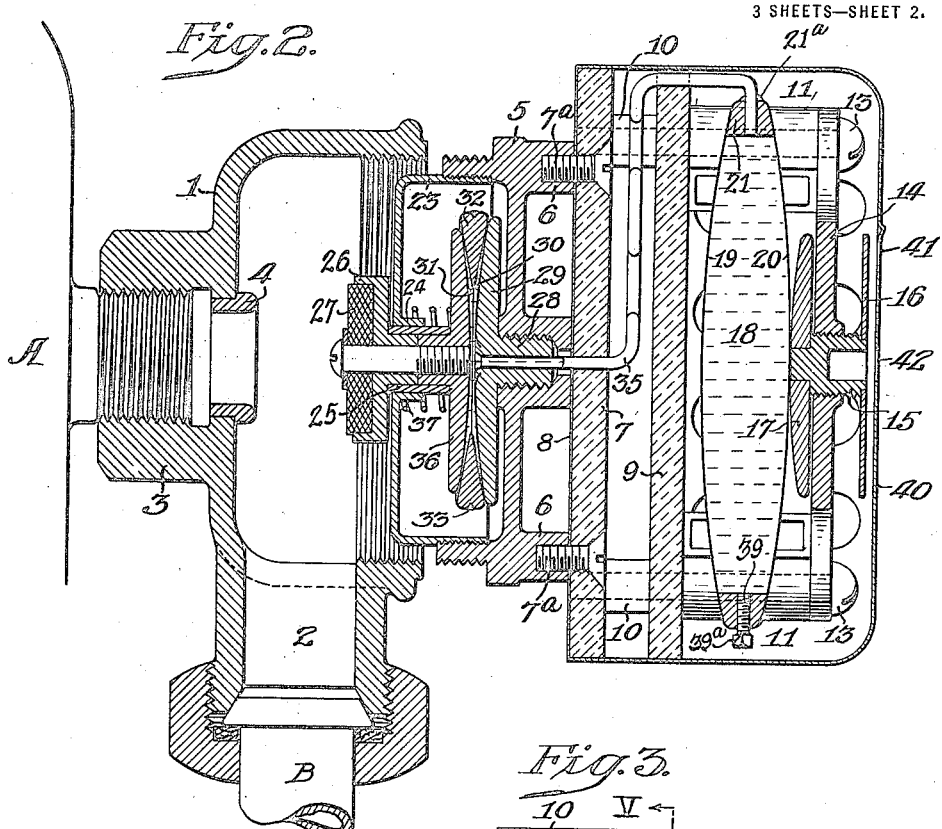
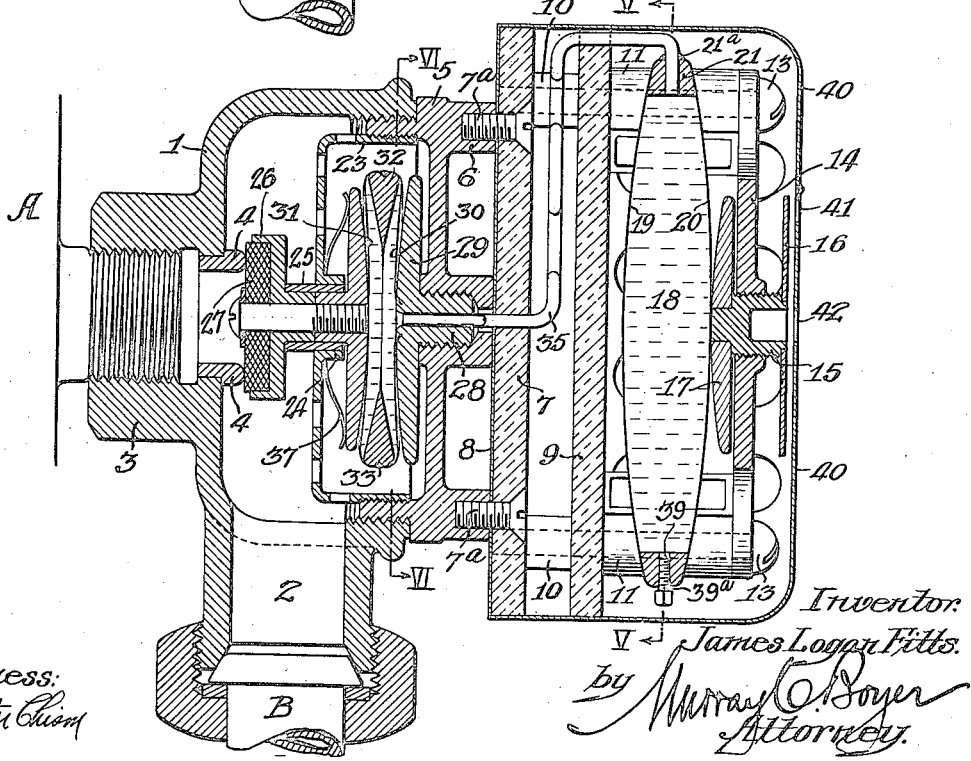

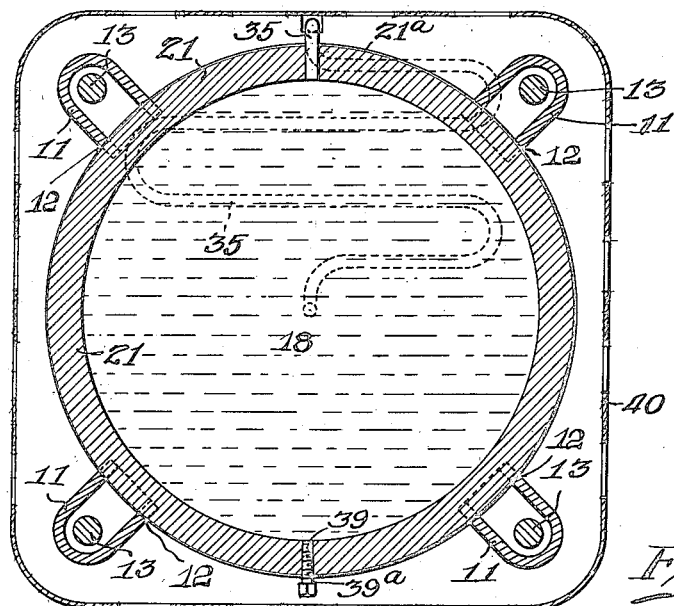
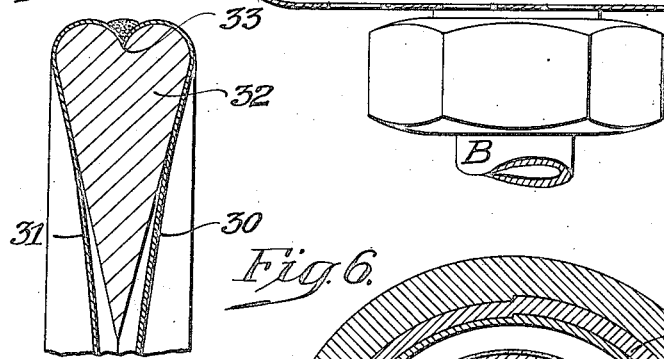
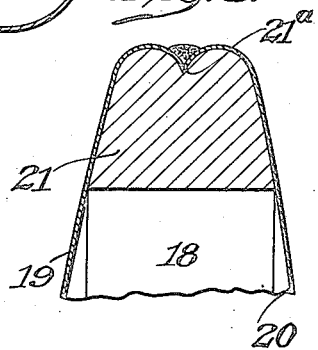
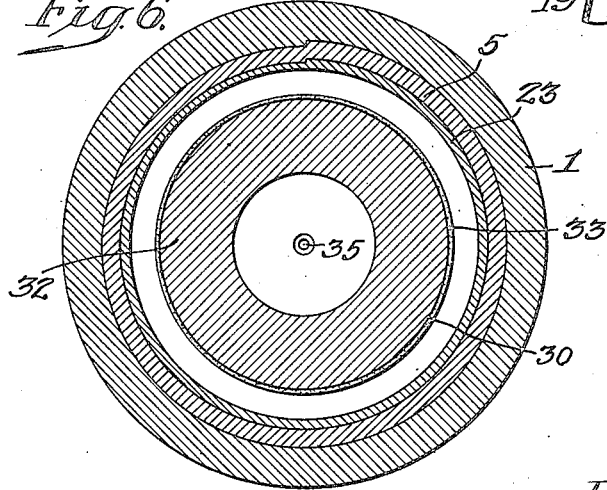

UNITED STATES PATENT OFFICE.

JAMES LOGAN FITTS, OF MERCHANTVILLE, NEW JERSEY, ASSIGNOR TO WARREN WEBSTER & COMPANY, OF CAMDEN, NEW JERSEY, A CORPORATION OF NEW JERSEY.

THERMOSTATICALLY-CONTROLLED VALVE.

1,425,189.  Specification of Letters Patent.  Patented Aug. 8, 1922.

Application filed January 17, 1921. Serial No. 437,862.

*To all whom it may concern:*

Be it known that I, JAMES LOGAN FITTS, a citizen of the United States, and a resident of Merchantville, Camden County, New Jersey, have invented certain new and useful Improvements in Thermostatically - Controlled Valves, of which the following is a specification.

My invention relates to apparatus employed for regulating or controlling the admission of steam to a radiator, coil and/or other similar heat distributing structure or element, hereinafter referred to as a radiator, and one object of my invention is the provision of means for automatically controlling the admission or exclusion of a heating medium, such as steam, to a radiator, so that the temperature of a room or apartment in which said radiator is located may be retained at a relatively constant point, or controlled within certain desirable and healthful limits which may be predetermined, without attention by or on the part of the occupant of said room or apartment.

My invention comprises apparatus containing within itself all the motive power necessary to operate a controlling valve; the action of such apparatus being dependent upon the temperature of the air adjacent the thermostatic element of the same, and the heat of the steam contained within the valve casing to which the apparatus forming the subject of my invention is attached.

A further object of my invention is simplicity of construction. In designing my improved valve-controlling device I have reduced the component parts as well as the number of joints, which latter are usually a source of great trouble, to a minimum, whereby I am enabled to increase the durability of my improved device for continuous service.

In devices of the type to which my invention relates, the vapor pressure of a fluid is expanded by the heat of steam surrounding a flexible or elastic walled metal vessel. When steam is not present, being shut off on mild days in fall and spring, and during the summer when no heat is required, the vapor is condensed and an extremely high vacuum is attained within the whole fluid-containing parts; the extent of vacuum being dependent upon the vapor pressure of the fluid at the ordinary atmospheric temperature. During this period of high vacuum, leakage of air is liable to take place into the fluid chambers, which condition would disarrange the operation of the apparatus. The device forming the subject of my invention is designed to obviate this condition of high vacuum and consequent damage. Additionally, should high summer heat expand the liquid contained within that portion of the structure which I term the "thermostat" it will have no damaging effect due to any possible increase in the pressure.

As I have noted in a pending application relating to similar subject-matter, the air in any room at the breathing line, say, five (5') feet above the floor and five (5') feet from the most exposed wall, bears a fairly definite relation to the temperature of air adjacent to and flowing past a radiator by induced currents of air due to the heat emitted from said radiator. That is to say, the temperature of the air adjacent to the ordinary hand valve placed at one end and at the top of a radiator has a definite temperature relation to the breathing line temperature and such relation is fairly constant whether the temperature of the room is high or low, within the limits usually met with in practice, although it may vary in its relation due to the shape of the room, the number of windows and doors and their position, the character of wall, etc., etc., from 2° F. to 8° F. from breathing line temperature; either above or below the same.

This condition obtaining, a "thermostat" located in approximately the same position as an ordinary hand valve on a radiator, with provision that it shall be least affected by the radiant or conducted heat from the pipe supplying the radiator with steam, will respond to changes of temperatures in the same manner as if placed at the breathing line point described and will therefore be competent to act in conjunction with other parts of the apparatus to effect an opening or closing of the steam admission valve, as the room temperature varies; such valve closing by increase of temperature and opening upon the lowering of the room temperature; all within certain definite relations.

This device is intended to take the place of hand control of the steam supply to a radiator and to be entirely automatic; dependent wholly upon the heat of the air in the room itself. It is also designed to control by gradual changes in temperature so that as the room becomes two or three degree cooler, the admission of steam to the radiator is increased in volume to make up for the heat losses, and per contra, as the room becomes heated the steam supply is gradually reduced, producing a heat balance which is sometimes termed "heat regulation," for such it is in effect.

With this device no attempt has been made to control the temperature wihin a narrow range, such as a single degree, as is frequenly proposed with devices using compressed air and with a thermostat somewhat remotely placed and carefully located on a certain wall or at a designed point to give such close regulation; but a regulation within the bounds of comfort, such as a maximum of 72° F., at which steam will be entirely shut off, and a minimum of, say 66° F., when steam will be flowing freely to the radiator and the latter is hot throughout.

It is not good practice to quickly shut off the steam supply to a radiator as is usually effected by pneumatic or electrical systems, for the absence of radiant heat is quickly felt. In view of this defect many of such systems attempt to provide what is termed a graduated action thermostat, remotely controlling a valve, but without success. My invention comprises a structure of the graduated type, which has proven efficient in actual operation.

It will be understood that to regulate the heat of a room proper radiating surface must be provided to fully supply all heat necessary to bring the room temperature up to and maintain the same at the desired point when the outside air temperature is the lowest, and with a sufficient supply of steam for such radiation at all times. Given the required radiating surface and steam supply, the automatically controlled valve will vary the steam admission to hold the temperature of the room within the reasonable limits determined.

Overheating, however, frequentlv occurs by heat from adjacent rooms, or from other sources that the radiation, not controlled, and in mild weather no steam is required. This device is not intended to cool a room nor to hold its temperature under these conditions, but to control the steam supply when the latter is required for heating purposes and when the temperature of the room varies within certain limits.

These and other features of my invention are more fully described hereinafter; reference being had to the accompanying drawings, in which:

Fig. 2, is a sectional elevation of my improved valve controlling device in relative position with respect to a valve casing at the radiator but detached therefrom; being taken on the line II—II, Fig. 4.

Fig. 3, is a view similar to Fig. 2 but showing the valve controlling device attached to a valve casing at the radiator and with the parts in the position assumed when the valve is closed; such view showing certon modified details.

Fig. 5, is a cross sectional view on the line V—V, Fig. 3.

Fig. 6, is a cross sectional view on the line VI—VI, Fig. 1, and

Figs. 7 and 8, are enlarged sectional views illustrating details of my invention.

Figure 1:
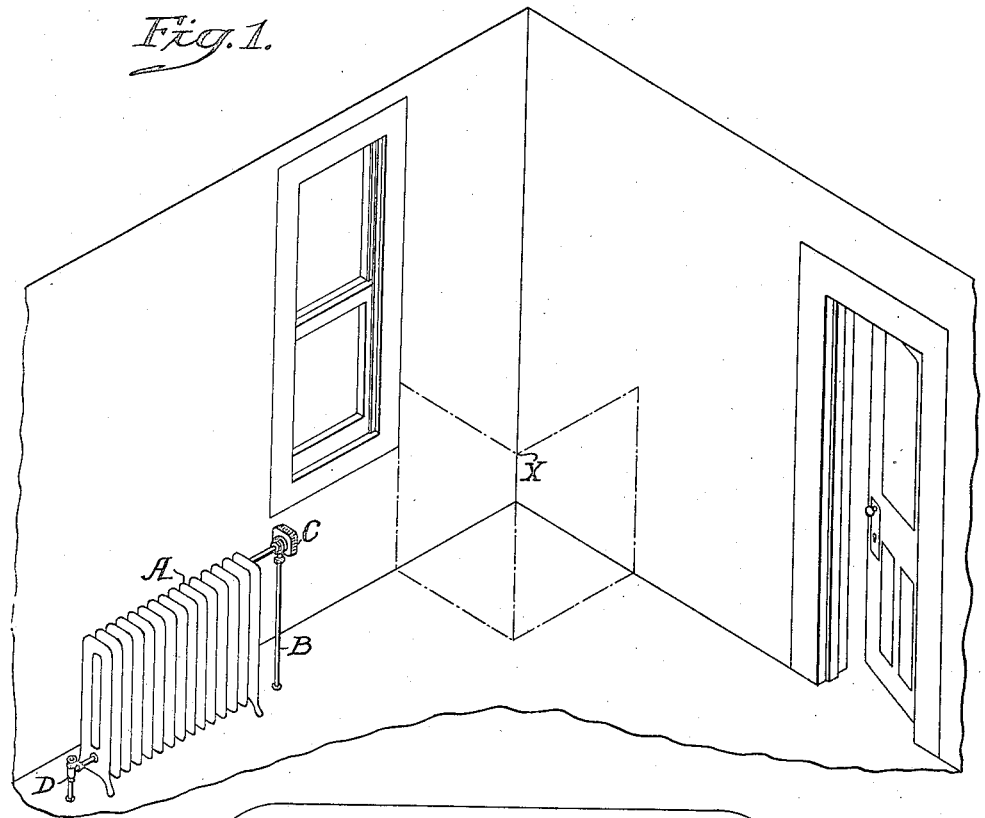
Figure 1, is a perspective view of a portion of a room containing a radiator to which my improved valve controlling device is attached.
Figure 4:
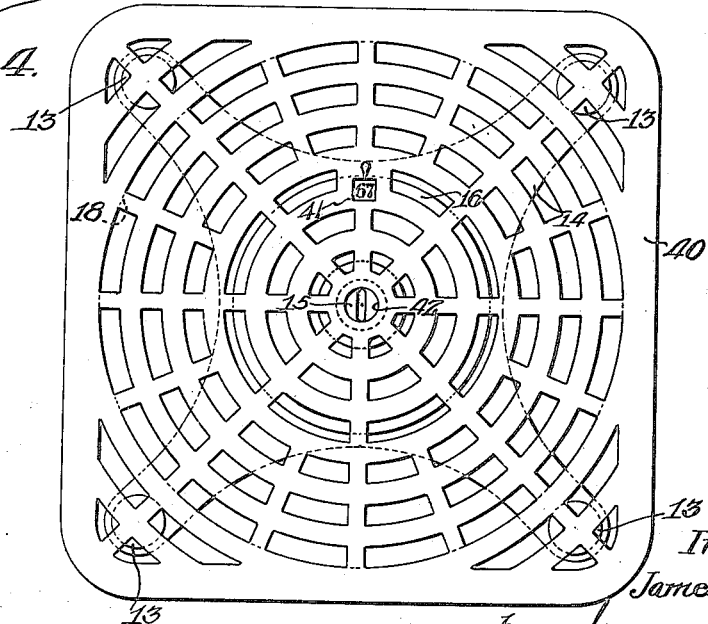
Fig. 4, is a front elevation of the valve controlling device as it appears when applied to a radiator.

Referring to the drawings, Fig. 1, shows a portion of a room with a radiator, and the preferred location of my improved regulating device with respect to such radiator, in which A is the radiator, B a steam supply pipe, C the improved automatic valve regulating or controlling device forming the subject of my invention, and D the return pipe for condensation water; the latter pipe having the usual trap to pass condensation water and air and restrict the passage of steam. The point X is assumed to be the breathing line point at which the temperatures hereinafter described are considered.

In Figs. 2 and 3, 1 represents a valve casing or body, having an inlet connection 2 with the supply pipe B, and outlet connection 3, with the radiator A; such valve casing being also provided with a valve seat 4, surrounding the outlet 3. A bonnet or closure 5, which may be screwed in to the body 1, or attached thereto by means of screws with an interposed gasket, carries the elements making up my improved valve-controlling device. This bonnet or closure may be provided with bosses 6, supporting a heat insulating plate 7, with a polished metal plate 8 attached to the front of the same and forming a reflecting surface; said plate 8 being disposed between said bonnet and the insulating plate and the latter may be attached to the bosses 6 by screws 7ª. Another heat insulating plate, indicated at 9, may be disposed beyond the plate 7, and separated therefrom by spacers 10 of non-conducting material.

Disposed adjacent to the plate 9 are supporting posts 11, preferably of non-conducting material, or of a metal of low specific heat, such as aluminum, which posts are notched at 12 on their inner sides.

These posts 11 may be secured to the plate 9 by means of screws 13 which also pass through the arms of a spider 14, overlying said posts. The center of the spider 14 may be provided with a threaded stem 15 to which a dial 16 may be attached, and said stem may also loosely carry a bearing plate 17, having a curved contact surface, for a purpose to be described.

Resting in the notches 12 of the supporting posts 11, is a hollow casing providing a fluid-containing chamber 18 which may comprise a pair of curved or dished plates 19 and 20, of thin flexible sheet metal, preferably a metal not easily corroded and of considerable tensile strength, such as phosphor bronze, nickel silver, monel metal, or the like. The curve of these plates 19 and 20 is such as to give the greatest strength to resist internal strain and retain their shape.

The bearing plate 17 may be curved on the same arc as the walls of the chamber 18, but reversely thereto, and when this plate 17 is pressed against the outer wall 20 of said chamber 18 by movement of the screw 15 when the latter is turned to set the dial 16, it will distort or press said wall inwardly, and as said plate is held rigidly by the screw and the spider 13, it will resist the pressure within the chamber 18.

The plates 19 and 20 of the chamber 18 are permanently attached at their outer edges to a rigid metal annulus 21, having its peripheral edge centrally grooved at 21ª, and into which groove the edges of the plates 19 and 20 may be turned and sealed thereto by solder, or welded; thereby forming the hollow casing providing the chamber 18, which I have termed the "thermostat."

Secured to the bonnet or closure 6 by a threaded connection or otherwise, and extending outwardly therefrom is a cage or cover 23, which may be perforated, as indicated in Fig. 3, and may have a central bearing flange 24, supporting and guiding a valve stem 25. This stem carries a valve piece 26, which may have a composition disk 27, suitably secured thereto and which may be brought against the seat 4, of the outlet passage 3, to close the same against the passage of steam to the radiator.

Disposed within the cage or cover 23, and attached to the bonnet 6, by a screw threaded boss 28, is an internal motor diaphragm element, comprising a back plate 29 carrying the boss 28, and to the center of which plate 29 is attached one wall 30 of a flexible metal diaphragm, the walls of which may be of phosphor bronze or like elastic yet strong metal, curved to a suitable arc. This attachment may be effected by flaring the material of the wall 30 around a central opening, inserting the flared portion in an annular recess in the back plate 28, and then swaging over the metal of the same and sealing the joint with solder.

A second flexible metal plate 31 is provided opposite the plate 30, and the plates making up this motor element are separated by an annulus 32, which may be wedge-shape in cross section, and having its peripheral edge centrally grooved at 33; the outer edges of the plates 30 and 31, being spun over the peripheral edge of said annulus and into the groove 33, with the joint so made well sealed with solder.

It will be seen that the two plates 30 and 31, with the annulus 32 form a chamber of very small volume since the annulus, being of the shape shown, fills the greater part of said chamber and supports the plates 30 and 31, when the latter are subject to internal pressure.

Between this motor element and the chamber 18, a small tube or pipe 35 is connected; the latter being hermetically sealed to the boss 28, and passed between the plates 7 and 9; being led back and forth in such space to extend its length and constituting a condensing space, and properly connected to the casing forming said chamber 18. This latter connection is with the annulus 21 and such connection is hermetically sealed against air entering or volatile fluid escaping from said chamber 18.

While I have shown a motor element for operating the valve comprising a pair of flexible plates attached to an annulus and subject to internal pressure, it will be understood that a multiple motor element, which may comprise a series of annuli, each with a pair of thin flexible plates and properly connected for passage of the volatile fluid in communication with the thermostat chamber, is within the scope of my invention.

Attached to the valve stem 25, is a metal bearing plate 36 which, due to the tension of a spring 37, interposed between said plate and the wall of the cage 23, causes said plate to bear against the wall 31 of the motor diaphragm, fully collapsing the same. The spring for this purpose may be a coiled spring, as indicated in Fig. 2, or I may employ a spring of sheet metal, having a plurality of forms in substantially spider form, as indicated in Fig. 3.

The system, comprising the chamber of the diaphragm motor, tube 35, and thermostat chamber 18 is completely filled, all air being expelled, with a volatile fluid such as acetone, methylol, or ethylol, which is preferably entered through an aperture 39 formed in the annulus 21, and when so filled a plug 39ª may be inserted in said aperture and screwed tightly in place, forming a hermetically sealed joint.

Arranged to cover the thermostat chamber, its supporting posts, the dial and adjusting screw, is a reticulated or foraminous protective cover 40, which may be fastened in any approved manner against ready removal, and this cover is provided with an opening 41, to permit reading of the graduations on the dial 16, and with an opening 42 at the center permitting access to the screw 15 to effect adjustment of the dial to any desired temperature indication in connection with the operation of the device. The cover is of such a character of open work as to provide for the free circulation of air about the casing forming the thermostat chamber 18, and is preferably made of metal of low specific heat, such as aluminum.

With the device assembled and charged with fluid and attached to a radiator as shown in Fig. 1, the valve is normally open and steam is flowing to the radiator. When the steam has heated the cage 23, the motor diaphragm and the bonnet 6, the fluid contained in the motor diaphragm will be volatilized and with the consequent vapor pressure therein will cause the walls 30 and 31 to expand; pressing against the bearing plate 36; compressing the spring 37, and closing the valve disk 27 against the seat 4, thus stopping the flow of steam to the radiator.

The pressure of the vapor of the volatilizing fluid will also be exerted through the tube 35 into the thermostat chamber 18, causing its flexible sides 19 and 20 to be distended. Plate 19 being relatively free will assume a normal curved form, but plate 20 will be limited more or less by the bearing plate 17, as may be regulated by the position of the screw 15 to which plate 17 is attached.

The temperature of the air surrounding the thermostat 18 being, say 68° F., and the dial being set to indicate 68° F., the fluid in said thermostat will be of the same temperature and its volume having the proper relation to that temperature, the valve will be closed and the flow of steam to the radiator will be shut off. Upon a lowering of the temperature of the atmosphere surrounding the thermostat 18, of two degrees for instance, the fluid content thereof will slightly contract, and a small portion of the vapor in the motor diaphragm will pass into said pipe or tube 35 and will be condensed to fluid. When this occurs, the internal pressure is materially reduced, and to such a degree that the force of the spring 37 exceeds the force of the vapor pressure within said motor diaphragm, the valve opens slightly, and a small volume of steam will pass into the radiator, heating the same, and will be distributed by radiation into the room. Upon a slightly greater fall in the temperature of the air at the thermostat, its heat will also further fall, with further contraction of its fluid content. With more vapor from motor diaphragm condensing in the tube 35 and the vapor pressure lowering, the spring 37 will then open the valve further with the consequent admission of a larger volume of steam to the radiator.

If, however, the air surrounding the thermostat should rise in temperature, owing to the heat distributed by the radiator, then the fluid in the thermostat chamber will also increase in temperature, increasing its volume and a small amount of fluid in the tube 35 will be forced toward and into the motor diaphragm and will be vaporized therein, or in that portion of tube 35 adjacent thereto, if sufficiently heated. By reason of this condition, the vapor pressure therein is increased, the spring 37 is compressed and the valve is moved toward the closing position to restrict the volume of steam admitted to the radiator. A slightly further rise in temperature of the thermostat will increase the volume of fluid therein; more fluid will vaporize in motor diaphragm with increase in pressure distending the flexible walls of said diaphragm and valve will be closed tightly. The cycle of operation will continue as the temperature of the air and thermostat change. If room air is cold, then the fluid in the thermostat will have contracted to such an extent that there will be no vapor pressure and the valve will be wide open; admitting full volume of steam required by the radiator.

When the conditions as above are reached there will, however, be a partial vacuum created within the motor diaphragm and the thermostat 18, which would be considerable when no steam is present, and if the plates 19 and 20 were rigid would be so high as to cause permanent collapse or inleak of air, if the sealing was imperfect. By reason of their thinness, however, these plates are highly resilient and one or both may harmlessly collapse to a limited extent; relieving the vacuum without serious or any permanent injury resulting.

By reason of the casing forming the thermostat chamber 18 being rigidly held at its outer edge within the notches 12 of the posts 11, the plates 19 and 20 return relatively to their original position; plate 19 fully distended and plate 20 pressing against the bearing plate 17 held by the screw 15 carrying the dial 16, and said chamber operating at the desired temperature to close the valve when the air temperature at the thermostat reaches the predetermined and indicated point.

If after initial charging of the apparatus with the volatile liquid employed there is a surplus of fluid in chamber 18, so that the action of valve does not correspond to that indicated by the figures of the dial, the excess may be bled out by loosening screw plug 39ª, permitting the fluid to escape in minute quantities until correct operation is obtained.

In use, in order to adjust the apparatus to operate at the desired room temperature at breathing line, it is only necessary to place a thermometer at the thermostat to learn the actual temperature at that point, and then to set the dial to conform to that temperature. If the thermometer at the breathing line shows a temperature of 72° F., and the thermometer at the thermostat a temperature of 67° F., or 5° F., less than that at breathing line, then the dial of the thermostat may be revolved until the line indicating 67° F., is at the index point, when the relative operating temperatures will be followed. If the temperature of the room at the breathing line falls from 72° F. to 70° F. that at the thermostat will fall from 67° F. to 65° F. and the valve will open to admit steam to the radiator or conversely, if room temperature rises from 70° F. to 72° F., the temperature at the thermostat will also rise from 65° F to 67° F. and the valve will close.

Under some conditions the air temperature at the thermostat may be higher than that at the breathing line and in such instance the dial may be revolved and set to conform to such temperature condition.

It will be seen from the foregoing that rotation of the screw 15 in one direction forces the bearing plate 17 against the flexible plate 20 pressing it inward. This compression or indentation reduces the cubical content of the chamber 18, forcing the volatile fluid through the tube 35 to the chamber of the motor diaphragm and when heat from the steam is present adjacent thereto, it changes this fluid to vapor, increasing the volume of vapor or its pressure and distending the plates 30 and 31. As the plate 31 is relatively free to press against the bearing plate 29, the valve stem is moved and the valve is brought to its seat cutting down or completely shutting off the inlet of steam. This corresponds to setting the operative temperature for a lower degree.

When the dial 16 is rotated by moving the screw 15 to retract the bearing plate 17 from plate 20, then the compression of the latter becomes less, the cubical content of the chamber 18 is slightly greater, and the heated vapor in the chamber of the motor diaphragm is permitted to pass to tube 35, condensing therein to fluid, with consequent reduction of vapor pressure and the valve is opened by the spring 37 when the tension of the latter exceeds the power exerted by the vapor pressure within the chamber of the motor diaphragm. This corresponds to setting the operative temperature at a higher degree.

After such adjustment of the indicating dial 16 by the screw 15, the operation is entirely one of heat changes affecting the specific volume of the fluid in chamber 18, with more or less vapor pressure in the chamber of the motor diaphragm due to the heat of the steam adjacent thereto. By reason of the form of the plates making up the casing of the chamber 18, and the position of the bearing plate 17 with relation thereto, its body is relatively rigid and its volume under any set condition is constant; any change due to the expansion of the metals of construction, which are very slight, being ignored.

My improved device is so connected to the valve casing attached to the radiator, that the latter may be closed by a suitable cap or cover, should it be necessary or desirable at any time to remove the heat controlling device, for any purpose; and such cap or cover may be connected to the valve casing in the same manner that the bonnet 6 is secured thereto.

While I have shown certain specific embodiments of my invention and have described with some particularity the construction thereof, I do not wish to be limited thereto and my claims are intended to cover the constructions illustrated and described as well as equivalent constructions capable of performing the desired and intended function.

I claim:

1. The combination, in thermostatically operated devices, of a valve casing having a seat, a valve adapted to engage said seat, bonnet or closure arranged for connection with said valve casing and carrying said valve, a plurality of fluid-containing chambers carried by said bonnet or closure; said chambers being in communication with each other and containing a volatile fluid, means for holding the peripheral edge of one of said chambers whereby its walls are free to move under the influence of the pressure within the same or pressure externally applied; the other chamber forming a motor element and having one wall free to move under the influence of internal pressure to react upon the valve and move the same against its seat; means for adjusting the position of one of the walls of the fixed chamber, and means for returning the valve when the pressure in the motor chamber is relieved.

2. The combination, in thermostatically operated devices, of a valve casing having a seat, a valve adapted to engage said seat, a bonnet or closure arranged for connection with said valve casing and carrying said valve, a plurality of fluid-containing chambers carried by said bonnet or closure, a tube forming communication between said chambers; the latter with said tube containing a volatile fluid, means for rigidly holding the peripheral edge of one of said chambers whereby its walls are free to move under the influence of the pressure within the same or pressure externally applied; the other chamber having one wall free to move under the influence of internal pressure to react upon the valve and move the latter against its seat; means for adjusting the position of one of the walls of the fixed chamber, a spring for returning the valve when the pressure in the motor chamber is relieved, and a casing enclosing said motor chamber.

3. The combination, in thermostatically actuated devices, of a valve casing, a valve seat carried by said casing, a valve adapted to engage said seat, a motor diaphragm chamber in operative engagement with said valve whereby the latter may be moved to the closed position when the pressure within the diaphragm chamber increases, a second diaphragm chamber constituting a thermostat; said thermostat having flexible walls and having its peripheral edge held in fixed position, a tubular connection between said diaphragm chambers a body of volatile fluid filling said diaphragm chambers and the tubular connection between the same, means for adjusting the position of one of the walls of the thermostat, and means for moving the valve to open position when the pressure in the chamber of the motor diaphragm decreases.

4. The combination, in thermostatically actuated devices, of a valve casing, a valve seat carried by said casing, a valve adapted to engage said seat, a motor diaphragm chamber in operative engagement with said valve whereby the latter may be moved to the closed position when the pressure within the diaphragm chamber increases, a second diaphragm chamber constituting a thermostat; said thermostat having flexible walls and having its peripheral edge held in fixed position, means for compressing one of the walls of said thermostat diaphragm, a tubular connection between said diaphragm chambers, a body of volatile fluid filling said diaphragm chambers and the tubular connection between the same, a spring for moving the valve to open position when the pressure in the chamber of the motor diaphragm decreases, and a foraminous casing enclosing said motor diaphragm.

5. In a structure such as set forth in claim 1, a thermostatic element comprising a casing made up of a pair of thin flexible walls attached to a rigid annulus, means for holding said annulus in fixed position, and means for applying external pressure to one of said walls.

6. In a structure such as set forth in claim 1, an expansible and contractile element comprising a casing made up of a pair of thin flexible walls permanently attached to a rigid annulus to form a chamber, said casing being double convex in cross section and said walls being of such shape and character as to resist internal pressure with the least amount of deformation.

7. In a structure such as set forth in claim 1, a thermostatic element comprising a casing made up of a pair of thin flexible walls attached to a solid annulus, means for holding said annulus in fixed position, a backing plate engaging one of the walls of said thermostatic element, a threaded mounting for said plate, and a temperature indicating dial connected to said threaded element whereby the latter may be moved to cause the backing plate to exert pressure upon the wall of the thermostatic element.

8. In a structure, such as set forth in claim 1, a motor diaphragm comprising a plurality of thin flexible walls connected together at their peripheral edges with an internal element occupying a large portion of the inner space of said chamber when the latter is collapsed, and a body of volatile fluid in said chamber; said fluid being subjected to expansion whereby the internal pressure may be increased and react upon the walls of said chamber.

9. In a structure, such as set forth in claim 1, a motor diaphragm comprising a plurality of thin flexible walls, a metal annulus connected to the peripheral edges of said walls; such annulus occupying a large portion of the inner space of said chamber when the latter is collapsed, and a body of volatile fluid in said chamber; said fluid being subject to expansion whereby the internal pressure may be increased and react upon the walls of said chamber.

10. In a structure, such as set forth in claim 1, a motor element comprising a plurality of thin flexible walls, a metal annulus to which the peripheral edges of said walls are secured, sealing means for such joint, such annulus occupying a large portion of the inner space of said chamber when the latter is collapsed, a body of volatile fluid in said chamber; said fluid being subject to expansion whereby the internal pressure may be increased and react upon the walls of said chamber, and a thermostatic element in fluid communication with said motor chamber and subject to temperature changes whereby the contained fluid may be caused to rise and fall in pressure and effect operation of the motor element.

11. In a structure such as set forth in claim 1, a valve casing, a bonnet or closure connected to said valve casing, a valve carried by said bonnet or closure, and volatile-fluid-containing chambers supported by said bonnet or closure and serving to move the valve under a force exerted by a rise in temperature.

12. In a structure such as set forth in claim 1, a valve casing, a bonnet or closure detachably connected to said valve casing, a valve carried by said bonnet or closure, volatile-fluid-containing chambers supported by said bonnet or closure and serving to move the valve under a force exerted by a rise in temperature, and a heat insulating plate interposed between said fluid-containing chambers.

13. In a structure such as set forth in claim 1, a valve casing, a bonnet or closure detachably connected to said valve casing, a valve carried by said bonnet or closure, a plurality of communicating volatile-fluid-containing chambers supported by said bonnet or closure and serving to move the valve under a force exerted by a rise in temperature, and means for moving said valve in the opposite direction when the temperature decreases.

14. In a structure such as set forth in claim 1, a valve casing, a bonnet or closure detachably connected to said valve casing, a valve carried by said bonnet or closure, a plurality of communicating volatile-fluid-containing chambers supported by said bonnet or closure and serving to move the valve in one direction under a force exerted by a rise in temperature, heat-insulating plates interposed between said fluid-containing chambers; one of said plates having a reflecting surface, and a spring for returning said valve when the temperature decreases.

15. In a thermostatically operated valve-controlling device, the combination of a valve casing having a seat, a valve for engagement with said seat, a bonnet or closure for said valve casing, a motor diaphragm supported by said bonnet; the valve being operatively connected with said motor diaphragm, an insulating plate carried by said bonnet, a thermostat chamber in fluid communication with said motor diaphragm, and means carried by the insulating plate for rigidly supporting said thermostat chamber.

16. In a thermostatically operated valve-controlling device, the combination of a valve casing having a seat, a valve for engagement with said seat, a bonnet or closure for said valve casing, a motor diaphragm supported by said bonnet, a cage enclosing said motor diaphragm and connected to the bonnet, a plurality of insulating plates supported by said bonnet; one of said plates having a reflecting surface directed toward the valve casing, a thermostat chamber, a tube affording fluid communication between said motor diaphragm and the thermostat chamber, and posts carried by one of the insulating plates to which the thermostat chamber is rigidly secured.

17. In a structure such as set forth in claim 15, a spider connected to the thermostat chamber supporting means, and a plate movably carried by said spider for reaction upon one of the walls of the thermostat chamber.

18. In a structure such as set forth in claim 16, a perforated cage enclosing the motor diaphragm, and a coil in the tubular connection disposed between the insulating plates and constituting a condensing section for the contained fluid.

19. In a structure such as set forth in claim 1, a valve casing having a seat, a closure detachably connected to said valve casing, a valve carried by said closure, and a plurality of volatile-fluid-containing chambers supported by said closure; one of said chambers being operatively connected said chambers and serving to move the same to said valve and serving to move the same under a force controlled by temperature changes.

20. In a structure such as set forth in claim 1, a valve casing having a seat, a closure detachably connected to said valve casing, a valve carried by said closure, a plurality of volatile-fluid-containing chambers supported by said closure; one of said chambers being operatively connected to said valve and serving to move the same under a force controlled by temperature changes, and heat insulating means interposed between said fluid-containing chambers.

21. In a structure such as set forth in claim 1, a valve casing having a seat, a closure detachably connected to said valve casing, a valve carried by said closure and arranged to engage the seat of the valve casing, a plurality of commuincating volatile-fluid-containing chambers supported by said closure; one of said chambers being operatively connected to said valve and serving to move the same under a force controlled by temperature changes, and means for assisting the movement of the valve in a direction away from its seat.

22. In a structure such as set forth in claim 1, a valve casing, a closure detachably connected to said valve casing; said casing having a valve seat, a valve carried by said closure and arranged to engage the seat of the valve casing, a plurality of communicating volatile-fluid-containing chambers supported by said casing; one of said chambers being operatively connected to said valve and serving to move the same under a force controlled by temperature changes, a plurality of heat insulating plates interposed between said fluid-containing chambers; one of said insulating plates having a reflecting surface, and a spring for assisting the movement of the valve in a direction away from its seat.

In witness whereof I have signed this specification.

JAMES LOGAN FITTS.